US010212223B2

(12) United States Patent
Rolia et al.

(10) Patent No.: US 10,212,223 B2
(45) Date of Patent: Feb. 19, 2019

(54) OVERLAY NETWORK MANAGEMENT

(71) Applicant: Hewlett Packard Enterprise Development LP, Houston, TX (US)

(72) Inventors: Jerome Rolia, Kanata (CA); Martin Arlitt, Calgary (CA); Gowtham Bellala, Palo Alto, CA (US); Wei-Nchih Lee, Palo Alto, CA (US); Jose Alberto Cueto Barcenas, Tlaquepaque (MX); Sherif Abdelwahab, Corvallis, OR (US)

(*) Notice: Subject to any disclaimer, the term of this patent is extended or adjusted under 35 U.S.C. 154(b) by 153 days.

(21) Appl. No.: 15/282,761

(22) Filed: Sep. 30, 2016

(65) Prior Publication Data
US 2018/0097876 A1    Apr. 5, 2018

(51) Int. Cl.
*G06F 15/173*     (2006.01)
*H04L 29/08*      (2006.01)
*H04L 12/24*      (2006.01)

(52) U.S. Cl.
CPC ...... *H04L 67/1076* (2013.01); *H04L 41/0816* (2013.01); *H04L 41/12* (2013.01); *H04L 67/1046* (2013.01)

(58) Field of Classification Search
CPC . H04L 67/1076; H04L 41/0816; H04L 41/12; H04L 67/1046
See application file for complete search history.

(56) References Cited

U.S. PATENT DOCUMENTS

| 7,907,544 | B2 * | 3/2011 | Graupner | H04L 69/329 370/254 |
| 8,254,287 | B2 | 8/2012 | Jayaram et al. | |
| 9,467,478 | B1 * | 10/2016 | Khan | H04L 63/205 |
| 9,794,128 | B2 * | 10/2017 | DeCusatis | H04L 41/12 |
| 2005/0091399 | A1 * | 4/2005 | Candan | H04L 29/06027 709/238 |
| 2005/0198320 | A1 * | 9/2005 | Chou | H04L 67/02 709/228 |
| 2008/0052410 | A1 * | 2/2008 | Soulet | H04L 67/104 709/244 |
| 2008/0147821 | A1 * | 6/2008 | Dietrich | G06F 17/30206 709/216 |
| 2008/0181135 | A1 * | 7/2008 | Yalagandula | H04L 41/12 370/255 |
| 2009/0055547 | A1 * | 2/2009 | Hudson | D01D 5/423 709/231 |
| 2009/0172164 | A1 * | 7/2009 | Tanaka | H04L 67/104 709/226 |
| 2009/0310518 | A1 * | 12/2009 | Jayaram | H04L 45/00 370/254 |

(Continued)

OTHER PUBLICATIONS

Candan, K.S. et al.; "Policy-based Resource Sharing in Streaming Overlay Networks"; Jun. 20, 2005; 31 pages.

(Continued)

*Primary Examiner* — Razu A Miah
(74) *Attorney, Agent, or Firm* — Hewlett Packard Enterprise Patent Department

(57) ABSTRACT

Overlay networks of application components are managed. Applicant components may create overlay networks based on policies of the application components and an environment of the overlay network. The overlay network may be adjusted based on changes to the policies or the environment.

20 Claims, 7 Drawing Sheets

(56) References Cited

U.S. PATENT DOCUMENTS

| | | | |
|---|---|---|---|
| 2010/0161817 A1* | 6/2010 | Xiao | H04L 63/126 709/229 |
| 2010/0312622 A1* | 12/2010 | Das | G06Q 30/0241 705/14.4 |
| 2011/0205949 A1* | 8/2011 | Maenpaa | H04W 40/005 370/311 |
| 2012/0222095 A1* | 8/2012 | Ushiyama | H04L 63/12 726/4 |
| 2012/0271895 A1* | 10/2012 | Maenpaa | H04L 12/18 709/206 |
| 2013/0304877 A1* | 11/2013 | Um | H04L 41/082 709/220 |
| 2015/0003296 A1* | 1/2015 | Fan | H04L 41/0806 370/255 |
| 2016/0269198 A1* | 9/2016 | Choi | H04L 12/4633 |

OTHER PUBLICATIONS

Coulson, G. et al.; "A Component-based Middleware Framework for Configurable and Reconfigurable Grid Computing"; Nov. 19, 2004; 10 pages.

Fan, J. et al.; "Dynamic Topology Configuration in Service Overlay Networks: a Study of Reconfigurable Policies"; Mar. 17, 2006; 12 pages.

* cited by examiner

OVERLAY NETWORK MANAGEMENT

BACKGROUND

Application overlay networks are networks that are built on top of other networks (e.g., virtual networks, physical networks, etc.). Nodes of the application overlay network may be connected via virtual or logical links. Application overlay networks may be established and maintained for specific purposes and facilitate communication between application components, devices, etc. using specified types of communication, protocols, etc.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
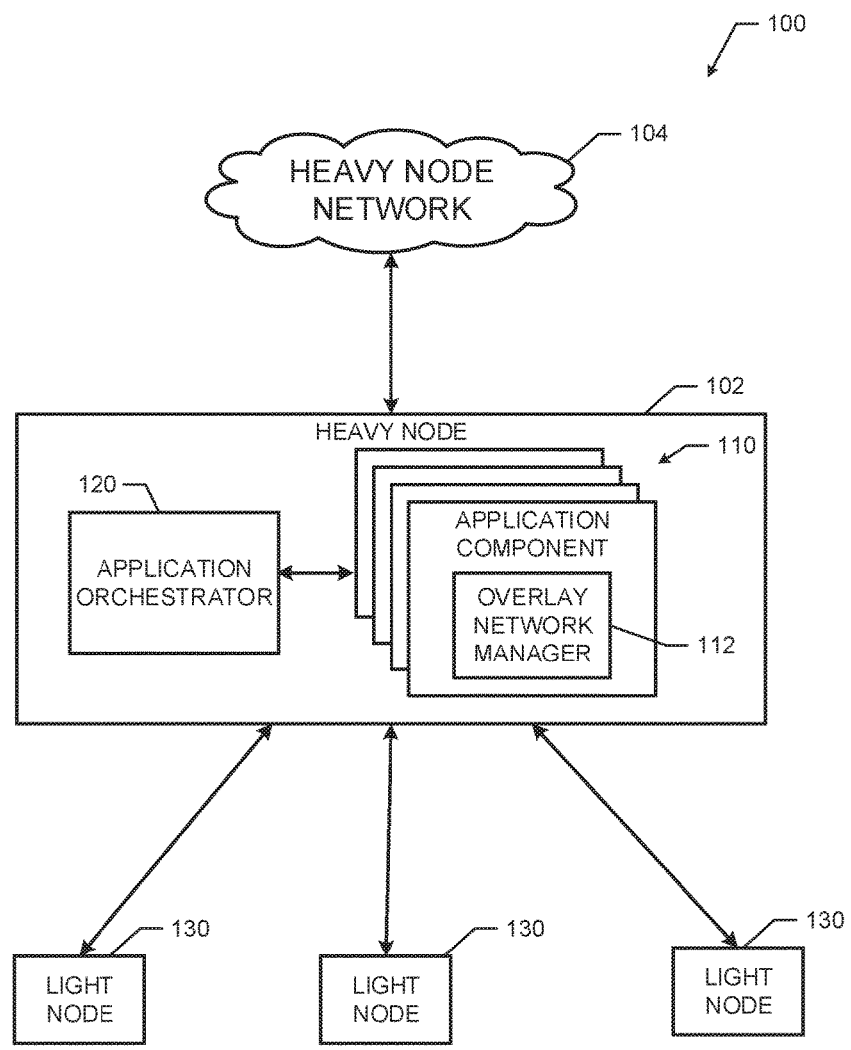
FIG. 1 illustrates a schematic diagram of an example overlay network system including a heavy node with an application orchestrator and applications components with overlay network managers in accordance with an aspect of this disclosure.

Examples disclosed herein involve management of application overlay networks. In examples herein, a platform is provided for dynamic, controlled, reliable information exchanges among devices and/or application components from different vendors that may operate using shared resources. The example overlay networks may be implemented on the edge (at or near the end user, sensor device, or other machine generated data) through to the enterprise and cloud. In examples herein, policies may be implemented, managed, and adjusted to govern access to data, participation in distributed analytics, and access to control interfaces. The example policies may be situationally dependent and adjustable based on conditions of an environment of the application components and/or the platform.

In many instances, applications and services (e.g., within or involving Big Data) are moved off devices on the edge (at or near the end user or end user devices) and into a centralized data, such as within a cloud network. Although this solves many problems related to large amounts of data, many devices (e.g., Internet of Things (IoT) devices, devices in remote locations, etc.) may not have adequate bandwidth available for all or most of the data for the service or application to be moved. Furthermore, the volume of data produced on the edge may be sufficiently large whereby the costs of moving the data may be prohibitive. In other instances, certain data may not be able to cross sovereign boundaries or customers may not be comfortable with data residing in a third-party data center. Moreover, an increasing number of IoT use cases, from the connected car to the smart grid, involve or use real-time performance and roundtrip latency associated with going from the edge to the cloud may be infeasible.

Accordingly, examples herein provide for a platform that moves the compute infrastructure closer toward the data gathering/utilizing devices (i.e., closer to the edge). In examples herein, heavy nodes that include low-power, large-memory (e.g., non-volatile memory) devices may be scattered throughout a network so that data can be stored, processed, and analyzed locally through a network, such as an overlay network. When any events occur on or with a particular heavy node, the heavy nodes may collaborate to collectively harness a level of intelligence that may be available from a cloud network but without the costs or risks of having to centralize the data in a single location. In examples herein, a platform is provided for dynamic, controlled, reliable information exchanges among devices and/or application components that may be from different vendors that operate using shared resources. The example overlay networks may be implemented on the edge (at or near the end user) through to the enterprise and cloud. In examples herein, policies may be implemented, managed, and adjusted to govern access to data, participation in distributed analytics, and access to control interfaces. The example policies may be situationally dependent and adjustable based on conditions of an environment of the application components and/or the platform. Accordingly, real-time control of an application overlay network may ensure the most reliable and up-to-date information can be accessed among the members of the overlay networks.

Examples herein involve creating, managing, and adjusting overlay networks. An example method includes identifying a plurality of application components to join an overlay network based on a request from a requesting application component and requesting the plurality of application components to join the overlay network. The example method may further involve establishing the overlay network to include the requesting application component and a set of application components from the plurality of application components and dynamically adjusting the configurations of the overlay network based on characteristics of an environment of the overlay network.

FIG. 1 is a diagram of an example overlay network system 100 constructed in accordance with examples herein. The example overlay network system 100 includes a heavy node 102 in communication with a network 104. The overlay network system 100 may be considered to be a distributed mesh computing (DMC) network or be included in a DMC network. In examples herein, the heavy node 102 may be considered to be part of the heavy node network 104 and the heavy node network 104 may include many additional heavy nodes (e.g., computing devices capable of hosting application services at the edge) similar to the heavy node 102 along with many other types of computing devices (e.g., servers, network devices (e.g., routers, switches, etc.), etc.). The example heavy node network 104 may be in communication with another network, such as a cloud network, a middleware network (e.g., a data distribution service (DDS)), the Internet, etc. Accordingly, the heavy node network 104 may facilitate communication to other communication devices or computing devices through such a network. In examples herein, the heavy node network 104 may be a dedicated or assigned network of heavy nodes, such as the heavy node 102, capable of providing application services to light nodes 130 (e.g., endpoint or edge devices). Accordingly, the heavy node 102 may include a light node gateway to facilitate communication with the light nodes 130. In some examples, the heavy node 102 may include a proxy for the light nodes to provide controlled access to the light nodes 130.

The heavy node 102 of FIG. 1 includes example application components 110, each application component comprising an overlay network manager 112, and an application orchestrator 120. In examples herein, the heavy node 102 facilitates application components 110 establishing, joining, and/or maintaining an overlay network within the heavy node network 104 in accordance with the overlay network managers 112 as disclosed in accordance with examples herein. As such, the overlay network system 100 of FIG. 1 enables overlay networks to exist that enable sharing and communication between the application components 110 of heavy nodes 102 of the heavy node network 104. The example application components 110 may be applications that provide application services provided by a same or several different vendors, which may be separate from an owner of the heavy node 102 and/or the overlay network system 100. Accordingly, at least two of the application components 110 may be owned/provided/managed by at least two different vendors.

In examples herein, the heavy node 102 is a computing device (e.g., a server, a computer, etc.) that hosts the example application components 110 (e.g., application services, such as, communication services, location services, financial services, database services, analytics services, etc.). In some examples, the heavy node 102 may be located on a vehicle (e.g., a car, a boat, an airplane, etc.). The heavy node 102 is in communication with a plurality of light nodes 130. The example light nodes 130 may be computing devices that utilize and/or provide data/information for the application components 110. The example light nodes 130 may be Internet of Things (IoT) devices, such as sensors, measurement devices, appliances, thermostats, security systems, etc. that may have limited processing power and/or resources relative to the heavy node 102 but are capable of communicating with the heavy node 102 and utilizing the application components 110 and/or providing information/ data for the application components 110. The example light nodes 130 may be from a same or different entity (e.g., a vendor that provides the application service to a consumer, such as a user of the heavy node 102 and/or at least one of the light nodes 130).

In examples herein, the application orchestrator 120 and the application overlay network managers 112 of the application components 110 coordinate to enable the application components 110 to establish, join, and/or adjust overlay networks that enable sharing of data between the application components 110 and/or with application components of other heavy nodes of the heavy node network 104. Accordingly, an application overlay network may be dynamically controlled via the application orchestrator 120 and the overlay network managers 112. For example, in response to characteristics of an overlay network or changes in the overlay network (e.g., an application component joining or leaving, load or resources for heavy nodes and/or application components changing, etc.), or in response to characteristics of the heavy node network (e.g., a heavy or light node joining or leaving), the topology of an overlay network may be adjusted accordingly (e.g., by opening or closing communication tunnels between heavy nodes and/or light nodes and/or the application components 110 of the overlay network system 100).

As further described below in connection with FIGS. 2 and 3, the application orchestrator 120 and the overlay network managers 112 of the application components 110 manage configuration, adjustment, and shutdown of application overlay networks in the overlay network system 100 of FIG. 1. The example overlay networks may be used to share information among the application components based on the configuration and management of the overlay network by the application orchestrator 120 and the application overlay network managers 112 of the application components 110. As such, rather than repeatedly sending data to a cloud network or other type of network, the heavy node 102 and heavy nodes of the heavy node network 104 may facilitate use of the application components at or near the edge. In other words, the overlay networks may facilitate local communication, sharing, and access to information without frequent or continuous calls a cloud network. In examples herein, an application orchestrator 120 or overlay network manager 112 may own an application overlay such that it can invite application components 110 to join the application overlay network, it can remove them from the application overlay network, and it may change the topology of the application overlay network. An application component 110 may transfer ownership, or, for example upon failure, have its ownership transferred to another application component 110 or application orchestrator 120 if this is permitted by policy.

Figure 2:
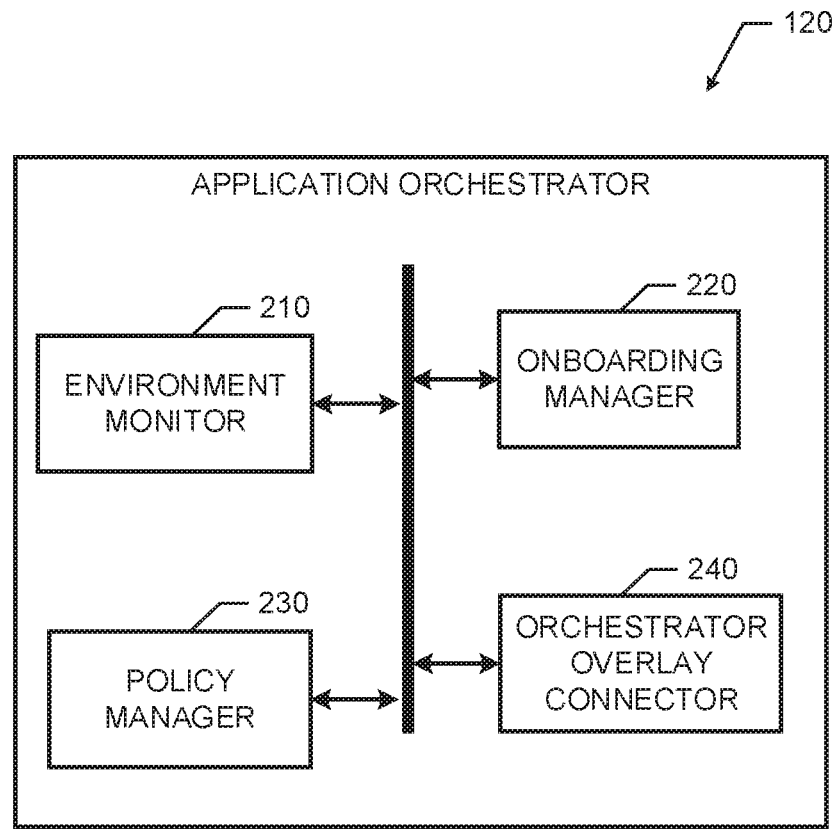
FIG. 2 is a block diagram of an example application orchestrator that may be used to implement the application orchestrator of FIG. 1.

FIG. 2 is a block diagram of an example application orchestrator 120 that may be used to implement the application orchestrator 120 of FIG. 1. The example application orchestrator of FIG. 2 includes an environment monitor 210, an onboarding manager 220, a policy manager 230, and an orchestrator overlay connector 240. In examples herein, the environment monitor 210 tracks conditions of an environment application overlay networks, the onboarding manager 220 manages overlay network adaptation activities (launching applications, shutting down applications, informing other application components 110 that they are obliged to adapt application overlay networks under their control, etc.), the policy manager 230 manages policies based on conditions and attributes of the overlay network and environment, and the orchestrator overlay connector serves as an interface for the overlay networks to handle communication services.

The example environment monitor 210 monitors an environment of overlay networks in examples herein. For example, the environment monitor 310 may monitor characteristics of the heavy node 102 including its light nodes 130, characteristics of the application components 110, characteristics of the heavy node network 104, and any other characteristics that may be relevant to the system 100. Example characteristics may include system load, available resources, processing capabilities (speed, bandwidth, etc.) numbers and types of members of an overlay network, communication capabilities (e.g., protocols, bandwidth, etc.) of members of the network, whether some event with application level meaning (e.g., fraudulent activity) has been identified, etc. Accordingly, the environment monitor 210 may analyze various systems, performance metrics, communications, etc. associated with the overlay network system 100. The environment monitor 210 may then provide information and/or data corresponding to the characteristics to the onboarding manager 220 and/or the policy manager 230 (which may be used to update a policy information point (PIP).

The example onboarding manager 220 manages overlay network adaptation activities for overlay networks of the overlay network system 100 of FIG. 1 based on policies of the overlay networks and/or the application components 110. For example, the onboarding manager 220 may determine whether the application components 110 are to be launched, shutdown, or whether their application overlay networks need to be adapted etc. Furthermore, the onboarding manager 220 may direct adaptation of overlay networks of the application orchestrator 120. In this case, the application orchestrator is also acting as an application component 110.

The example onboarding manager 220 may make such decisions based on information from the environment manager 210 and/or the policy manager 230. In examples herein, the onboarding manager 220 may inform an application component 110 to adapt an application overlay network. In some examples, an application component 110 may be an owner of an overlay network, that may adjust quality of service (QoS) policies, topology configurations, and settings for the overlay network. In some examples, an application may just be a member of an application overlay network and may be informed to leave the application overlay network. The onboarding manager 220 may identify application components to invite to an application component's application overlay network based on characteristics of the application components in communication with (or registered) with the application orchestrator 120. For example, the onboarding manager 220 may maintain a registry of application components managed by or in communication with the application orchestrator. The registry may include characteristics and information associated with the application components. Such characteristics of application components may include a particular type of the application component, interfaces that are supported, data that has been received, measured, or accessed by the application component, measurement, performance capabilities of the application component, etc. In examples herein, characteristics of application components that are to join or to be invited to join an overlay network may be specified in a request from an application component 110 requesting to create an overlay network. The registry may be part of a policy information point (PIP) as managed by the policy manager 230.

The example policy manager 230 of FIG. 2 manages policies for application components 110 of FIG. 1. For example, the policy manager 230 may include a policy administration point (PAP), policy decision point (PDP) and a policy information point (PIP). The example PAP may be used to define policies for the application components 110 and/or overlay networks of the application components 110. Different vendors and/or a DMC owner may specify polices for application components under their administration. The PDP may be used for overlay network management whenever an application overlay network event takes place in an overlay network. For example, when an application component 110 attempts to create or join an overlay network, a policy rule of the PDP may be used to verify or determine that the application component 110 is able to create or join the overlay network, respectively. Further, policies may include obligations. The example policy manager 230 supports attribute-based and role-based access control. Accordingly, situational attributes that may affect policy (e.g., performance, load, capacity, topology, etc.) may be used to control and configure an application overlay network. Furthermore, interfaces (instructions for interacting with the overlay network, such as, how often to send/receive data, what data to provide/retrieve, etc.) may be assigned or selected by application components and may be an attribute of policy.

The PDP of the policy manager 230 may also be used for overlay network management when a related system event takes place. For example, when a light node 130 joins or departs a heavy node 102 a request may be made by an onboarding manager 220 to evaluate a policy to determine what obligations are associated with the policy associated with that event. In examples herein, when an event for management of an application overlay network takes place or a related system event takes place, the policy manager 230 evaluates a policy and may provide a number of obligations (e.g., performance objectives/requirements, communication objectives/protocols, etc.). The example obligations may include instructions for launching or shutting down new application services and/or changing configurations (e.g., topology, communication paths, communication protocol, etc.) of overlay networks.

The example orchestrator overlay connector 240 serves as an interface between the orchestrator and overlay networks managed or in communication with the application orchestrator 120. Accordingly, the application orchestrator 120 may access and/or communicate with member application components of overlay networks via the orchestrator overlay connector 240 as the orchestrator overlay connector 240 is connected to overlay networks. The orchestrator overlay connector 240 may utilize any suitable communication protocols to communicate and manage the application overlay networks. Accordingly, the orchestrator overlay connector 240 may handle communication services of the application components.

While an example manner of implementing the application orchestrator 120 of FIG. 1 is illustrated in FIG. 2, at least one of the elements, processes and/or devices illustrated in FIG. 2 may be combined, divided, re-arranged, omitted, eliminated and/or implemented in any other way. Further, the environment monitor 210, the onboarding manager 220, the policy manager 230, the orchestrator overlay connector 240, and/or, more generally, the example application orchestrator 120 of FIG. 2 may be implemented by hardware and/or any combination of hardware and executable instructions (e.g., software and/or firmware). Thus, for example, any of the environment monitor 210, the onboarding manager 220, the policy manager 230, the orchestrator overlay connector 240, and/or, more generally, the example application orchestrator 120 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the environment monitor 210, the onboarding manager 220, the policy manager 230, and/or the orchestrator overlay connector 240 is/are hereby expressly defined to include a tangible machine readable storage device or storage disk such as a memory, a digital versatile disk (DVD), a compact disk (CD), a Blu-ray disk, etc, storing the executable instructions. Further still, the example application orchestrator 120 of FIG. 2 may include at least one element, process, and/or device in addition to, or instead of, those illustrated in FIG. 2, and/or may include more than one of any or all of the illustrated elements, processes and devices.

Figure 3:
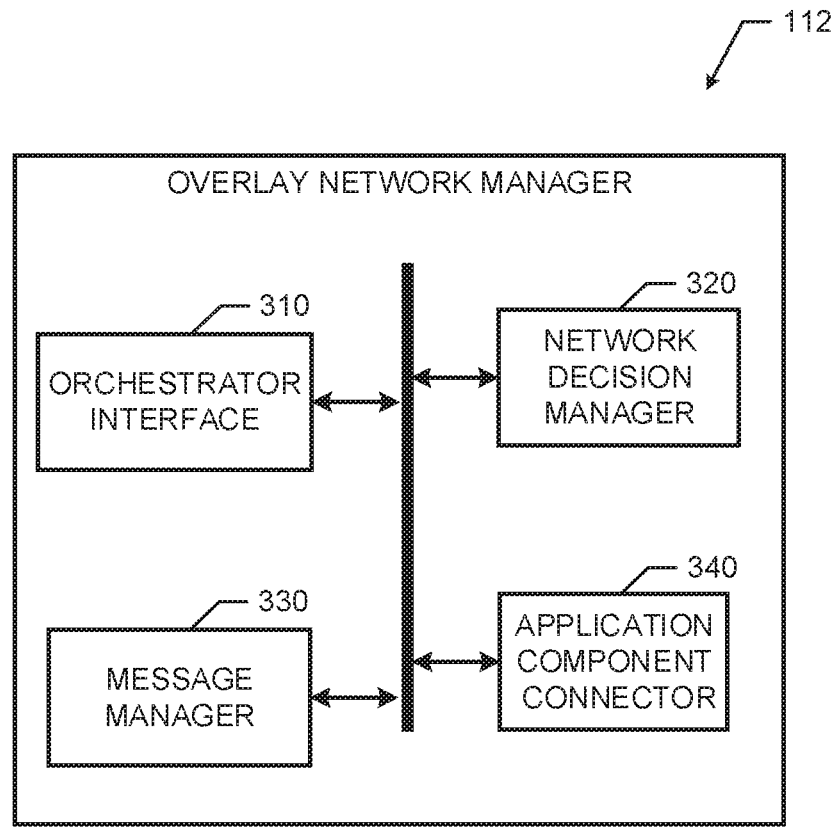
FIG. 3 is a block diagram of an example overlay network manager that may be used to implement the overlay network managers of FIG. 1.

FIG. 3 is a block diagram of an example overlay network manager 112 that may be used to implement the overlay network managers 112 of the application components 110 of FIG. 1. The overlay network manager 112 of FIG. 3 includes an orchestrator interface 310, a network decision manager 320, a message manager 330, and an application component connector 340. In examples herein, the orchestrator interface 310 serves an interface with the application orchestrator 120 (of FIGS. 1 and/or 2), the network decision manager 320 determines whether the application component 110 of the overlay network manager 112 should create or join an application overlay network, the message manager 330 manages messages, data, etc, sent/received to/from members of overlay networks of the application component of the overlay network manager 112, and the application component connector 340 serves as an interface to the application overlay network.

The example orchestrator interface 310 of the overlay network manager 112 of FIG. 3 enables communication with the application orchestrator 120 of FIGS. 1 and/or 2. For example, the communication may take place over an application overlay network established between an application component 110 of the overlay network manager 112 of FIG. 2 and the application orchestrator. Accordingly, the orchestrator interface 310 serves as an interface between an application component 110 of the overlay network manager 112 and the application orchestrator 120. Therefore, the overlay network manager 112 may receive communications (e.g., environmental information, policy information, overlay network management information, overlay network requests, etc.) from the application orchestrator 120. Furthermore, the overlay network manager 112 may provide data (e.g., status data, performance data, etc.) corresponding to an application component 110 of the overlay network manager 112, acceptance or denial of invitations to join an overlay network, requests to create an application overlay network, etc.

The network decision manager 320 of FIG. 3 interacts with the application orchestrator 120 to determine whether or not an application component is permitted to create or join an application overlay network. In determining whether to create an application overlay network, the network decision manager 320 may determine that additional information may be needed and/or may be retrieved from other application components in communication or accessible to the application component 110. The example network decision manager 320 may identify such application components based on queries to the application orchestrator 120 and/or to other application components (including the application components 110) of the overlay network system 100. The policy decision is then enforced by the application component connector 340. The application component 110 may select or establish settings for a created overlay network, such as topology (ring, tree, task graph, etc.), communication protocol, capacity, etc. Furthermore, the network decision manager 320 may make decisions whether to accept or deny invitations to join a particular application overlay network. For example, the network decision manager 320 interacts with the application orchestrator 120 to determine whether to accept or deny the invitations. The example network decision manager 320 may report accept an invitation based on default settings or based on the type of service requested (e.g., what data or type of data the application component is to provide) in a request (invitation) to join an overlay network. The policy decision is then enforced by the application component connector 340. Furthermore, the network decision manager may consider various other factors that may be specified by an owner or user of a distributed mesh computing network when determining whether to join an overlay network. Such factors may include whether the application component 110 is a member of other overlay networks, whether the application component 110 is able to share information with other application components, whether other member application components of the overlay network are from same or different vendor, etc. These considerations are subject to policy as maintained by the application orchestrator 120. The example PAP of the application orchestrator 120 may store or maintain policies for specific application components that indicate when an application component 110 may or may not join a particular overlay network. A policy may be from a vendor or DMC owner that has administrative responsibility for application components 110 or relationships between them and/or the environment.

The example message manager 330 of FIG. 3 of the overlay network manager 112 manages message sent/received via application overlay networks of an application component of the overlay network manager 112. For example, the messages may include application specific data for an application component 110 that is requested by or received from other member application components of an overlay network. Accordingly, the message manager 330 may generate and/or interpret messages sent/received over an application overly network managed by the overlay network manager 112. In examples herein, any suitable information/data may be sent over the application overlay network in accordance with the configurations and settings of the application overlay network established by the application orchestrator and/or the overlay network manager 112.

The example application component connector 340 is an interface to the overlay networks of an application component 110 of the overlay network manager 112. The example application component connector 340 may implement a policy enforcement point (PEP). The example policy enforcement point to enable or disable communication with an application overlay network based on analysis by the network decision manager 320 and/or the application orchestrator 120. Accordingly, the application component connector 340 may connect or disconnect communication paths or tunnels based on policies of the application component 110 of the overlay network manager 112. Furthermore, the application component interface 340 may have capabilities to establish any suitable types of communication with overlay networks. As such, the application component connector 340 may join an overlay network by establishing a communication path or tunnel with a specific member or members of the overlay network to create or expand or contract a particular topology (e.g., ring, tree, task graph, etc.). In some examples, only those communication tunnels permitted by policy are possible so communications via the tunnels are secure to applications permitted to be part of the overlay network.

As such, the overlay network manager 112 works in accordance with the application orchestrator 120 to establish overlay networks between application components to govern access to data, participation in distributed analytics, and access to control interfaces near the edge (near the endpoints of the application components).

While an example manner of implementing the overlay network manager 112 of FIG. 1 is illustrated in FIG. 3, at least one of the elements, processes and/or devices illustrated in FIG. 3 may be combined, divided, re-arranged, omitted, eliminated and/or implemented in any other way. Further, the orchestrator interface 310, the network decision manager 320, the message manager 330, the application component connector 340 and/or, more generally, the example overlay network manager 112 of FIG. 3 may be implemented by hardware and/or any combination of hardware and executable instructions (e.g., software and/or firmware). Thus, for example, any of the orchestrator interface 310, the network decision manager 320, the message manager 330, the application component connector 340 and/or, more generally, the example overlay network manager 112 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the orchestrator interface 310, the network decision manager 320, the message manager 330, and/or the application component connector 340 is/are hereby expressly defined to include a tangible machine readable storage device or storage disk such as a memory, a digital versatile disk (DVD), a compact disk (CD), a Blu-ray disk, etc. storing the executable instructions. Further still, the example overlay network manager 112 of FIG. 3 may include at least one element, process, and/or device in addition to, or instead of, those illustrated in FIG. 3, and/or may include more than one of any or all of the illustrated elements, processes and devices.

Figure 4:
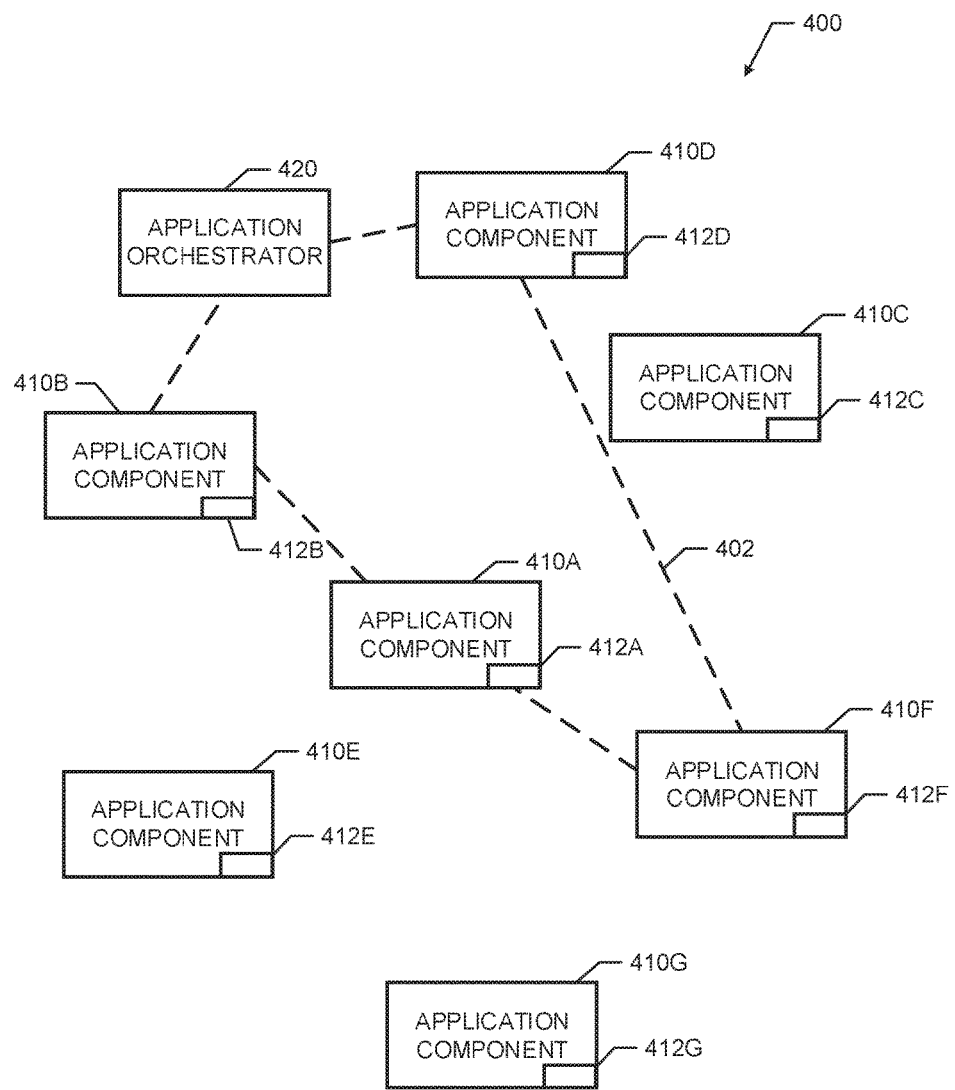
FIG. 4 is a schematic diagram of an example distributed mesh computing network including an application orchestrator that may be implemented by the application orchestrator of FIG. 2 and application components including overlay network managers that may be implemented by the overlay network manager of FIG. 3 to create and/or manage an overlay network in accordance with an aspect of this disclosure.

FIG. 4 illustrates a schematic diagram of an overlay network established in a DMC network 400 of application components 410A-410G (which may be referred to collectively as application components 110) including overlay network managers 412A-412G, respectively, and an application orchestrator 420, which may be implemented by the application orchestrator 120 of FIG. 2. The example overlay network managers 412A-412G (which may be referred to collectively as overlay network managers 412) may be implemented by overlay network manager 112 of FIG. 3. In FIG. 4, the application components 410 may be registered with the application orchestrator 420 (which may occur during startup of the application components 410). Accordingly, the application orchestrator 420, which may be owned by an owner of the DMC network 400, may serve as a proxy and support the management of overlay networks for the application components 410, which may be owned/provided by a plurality of different vendors. In the example of FIG. 4, the application components 410 may be located on a same heavy node or multiple different heavy nodes and the application orchestrator 420 may be located on a same or different heavy node as any of the application components 410. Furthermore, in some examples, multiple application orchestrators similar to the application orchestrator 420 that are associated with the application components 410 may be included in the DMC network of FIG. 4 on separate heavy nodes from the application orchestrator 420.

FIG. 4 is provided to include examples of the application components 410 establishing or joining an overlay network via the overlay network managers 412 and the application orchestrator 420. In the example of FIG. 4, an overlay network 402, as indicated by a dashed line, may be established by the application component 410A. To establish the first overlay network 402, the application component 410A may specify the characteristics of application components 410 (including 410B-410F and any other application components that may be in communication with the application orchestrator 420) that are to be invited to join the network to the application orchestrator 420. For example, the request may indicate which application components are to be invited based on characteristics of the application components 410, such as type, owner, etc. In some examples, the application orchestrator 420 may in response identify other members (e.g., 410B-410G) capable of joining an overlay network of the application component 410A to share or exchange data/ information that may be used or useful to the application component 410A based on the policies and characteristics (e.g., type, communication capabilities, performance abilities, capacity, location, environmental, etc.) of the application component 410A.

The application component 410A may then identify the application components 410B-410G and send an invite to the application components 410B-410G to join the overlay network of the application component 410A. In response to receiving the invite, each of the overlay network manager 412B-412F may determine, via the network decision manager 320, whether to join the overlay network of 410A. In the illustrated example of FIG. 4, the application components 410B, 410D, 410F accepted the invitation to join the network while the application components 410C, 410E, 410G declined the invitation to join the overlay network. Such decisions may be based on the characteristics of the requesting application component 410 (e.g., type, owner, etc.) or configuration of the overlay network in the request (e.g., performance requirements, communication requirements, number of members, environmental, etc.). Accordingly, upon accepting the invitations, the application components 410A, 410B, 410D, 410F may communicate directly with one another via the overlay network 402. For example, the application components 410A, 410B, 410D, 410F may provide data received from light nodes (e.g., the light nodes 130 of FIG. 1) utilizing or providing information to the application components 410A, 4106, 410D, 410F. As such, the application components 410A, 410B, 410D, 410F may have faster access to more data without necessarily referring to application components located in a cloud network or other distant network. The application components 410A, 410B, 410D, 410F may store, access, and utilize application data closer to the edge relative to a cloud network or cloud application service. The application component 410A may then terminate the application overlay network when the purpose for the interactions has been satisfied. The application component overlay network managers 412A, 412B, 412D, 412F then terminate the tunnels used for the communications. In this way application overlay networks are dynamic, secure, and application driven.

The example overlay network 402 of FIG. 4 is a ring network including the application orchestrator 420. However, in some examples, the application orchestrator 420 may not be included within the ring of the overlay network 402 and only communicates with one of the application components (e.g., the requesting application component 410A) regarding onboarding activities. Furthermore, the application orchestrator 420 and/or the application components 410A, 410B, 410D, 410F of the overlay network 402 may establish any other type of network (e.g., tree, task graph, etc.) or change the topology of the networks they own based on characteristics.

In FIG. 4, the application orchestrator 420 monitors the environment of the DMC network 400 via the environment monitor 210. In an example, if any of the application components 410A, 410B, 410D, 410F of the overlay network 402 is incapable of maintaining communication (e.g., due to error, shutdown, etc.) or reach performance objectives (e.g., sending a message every minute, limited processing power, etc.), the application orchestrator 420 may request the owner of the overlay network (e.g., the requesting application component 410A) to remove that application component from the overlay network 402. In some examples, if a new application component joins the DMC network 400 that has similar characteristics as the application component 410A (or as the application components 410B, 410D, 410F), the application orchestrator 420 may request the owner of the overlay network 402 (e.g., the requesting application component 410A) to invite that application component to join the overlay network 402. Accordingly, the application orchestrator 420 supports the application component 410A's dynamic addition or removal of application components to/from application overlay networks based on characteristics of an environment or characteristics of the overlay network itself. Meanwhile, the overlay network managers 412A, 412B, 412D, 412F may handle application specific communications via the overlay network and may make policy changes or decisions to remain in the overlay network 402 based on information (e.g., environmental information) received from the application orchestrator.

Accordingly, the overlay network 402 of FIG. 4 may be established, monitored, and dynamically adjusted by the application orchestrator 420 and/or the overlay network managers 412A, 412B, 412D, 412F of the application components 410A, 410B, 410D, 410F to store, share, access, and maintain data for the application components at or near the edge (i.e., at or near the heavy node of the application orchestrator 420). For example, the overlay network may be adjusted in real-time as events occur in the overlay network or system 100. Such events may include errors (e.g., application component errors/failures/shutdowns, communication errors, host or heavy node errors, etc.), communication events (e.g., messages, invitations, status messages, etc.), performance issues (increase or decrease in bandwidth, speed, resources, etc.), light nodes 130 or heavy nodes 102 starting up or shutting down, etc.

Figure 5:
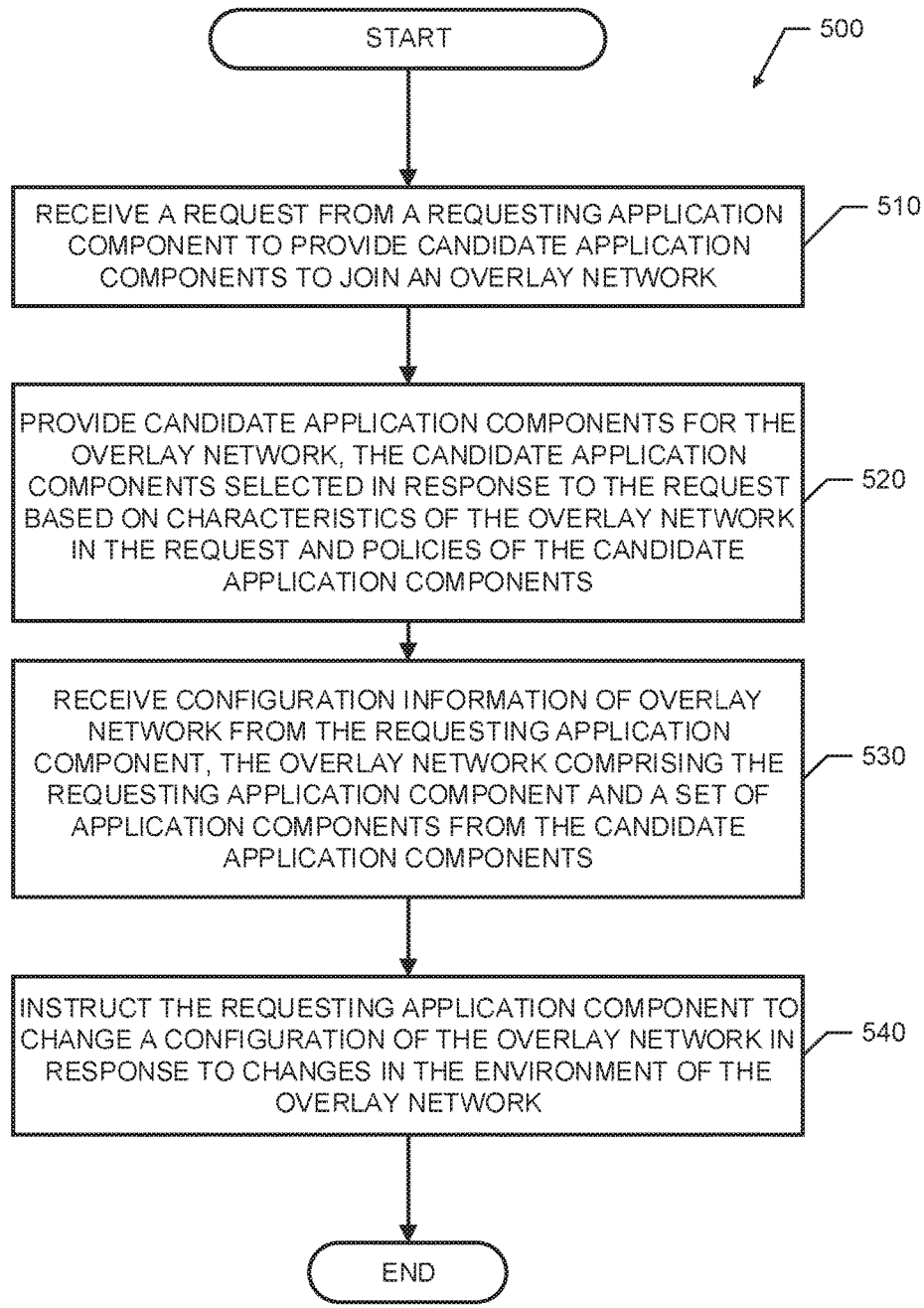
FIG. 5 is a flowchart representative of example machine readable instructions that may be executed to implement the application orchestrator of FIG. 2.

A flowchart representative of example machine readable instructions for implementing the application orchestrator 120 of FIG. 2 is shown in FIG. 5. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 5, many other methods of implementing the example application orchestrator 120 may alternatively be used. For example, the order of execution of the blocks may be changed, and/or some of the blocks described may be changed, eliminated, or combined.

The example process 500 of FIG. 5 begins with an initiation of the application orchestrator 120 (e.g., upon startup, upon instructions from a user, upon startup of a device implementing the application orchestrator 120 (e.g., the heavy node 102), etc.). The example process 500 of FIG. 5 may be executed to enable application components to create an application overlay network, monitor the overlay network, and maintain the overlay network in accordance with examples herein. At block 510, the orchestrator overlay connector 240 receives a request from a requesting application component to provide candidate application components to join an overlay network. At block 520, the onboarding manager 220 sends provides candidate application components (e.g., in a list) for the overlay network, in which the candidate application components are selected in response to the request based on characteristics of the overlay network in the request and policies of the candidate application components managed by the policy manager 230.

At block 530 the environment monitor 210 receives information on the environment of the overlay network from the requesting application component (e.g., the owner of the overlay network). The overlay network of block 530 includes the requesting application component and a set application components from list of the candidate application components. At block 540, the onboarding manager 540 instructs the requesting application component to change a configuration of the overlay network in response to changes in the environment of the overlay network or changes in characteristics of at least one of the set of application components that conflict with policies of any of the set of application components. After block 540, the example process 540 ends.

In some examples of the process 500 of FIG. 5, the policy manager 230 may identify characteristics of the overlay network (e.g., a service to be provided, a type of data to be shared, performance requirements, communication requirements etc.), and the policy manager may select the candidate application components based on the ability of the candidate application components to share data according to the characteristics of the overlay network. In some examples, the configuration information of block 530 indicates a topology of the overlay network and indicates the application components of the set of application components. The example changes of the environment of the overlay network in block 540 may comprise an application component of the set of application components shutting down (e.g., in response to the onboarding manager 220 determining that the application component is to be shutdown based on characteristics of the environment or the overlay network). In some examples, the changes of the environment of the overlay network in block 540 may include an application component of the set of application components being unable to meet performance requirements of the overlay network as specified by the characteristics of the overlay network in the request. In some examples of the process 500, the policy manager 230 may determine that a new application component is capable of joining the network based on characteristics of the overlay network in the request after the overlay network is created and the onboarding manager indicates to the requesting application component that the new application component is available to be added to the overlay network. In some such examples, the onboarding manager 220 and/or the policy manager 230 may receive an indication of whether the new application component is added to the overlay network (e.g., so that a registry for the overlay network managed by the policy manager 230 can correspondingly be updated). Additionally or alternatively, in the example process 500 of FIG. 5, the policy manager 230 may receive changes to a configuration of the overlay network in the configuration information, and the policy manager 330 may adjust policies for the overlay network based on the changes.

Figure 6:
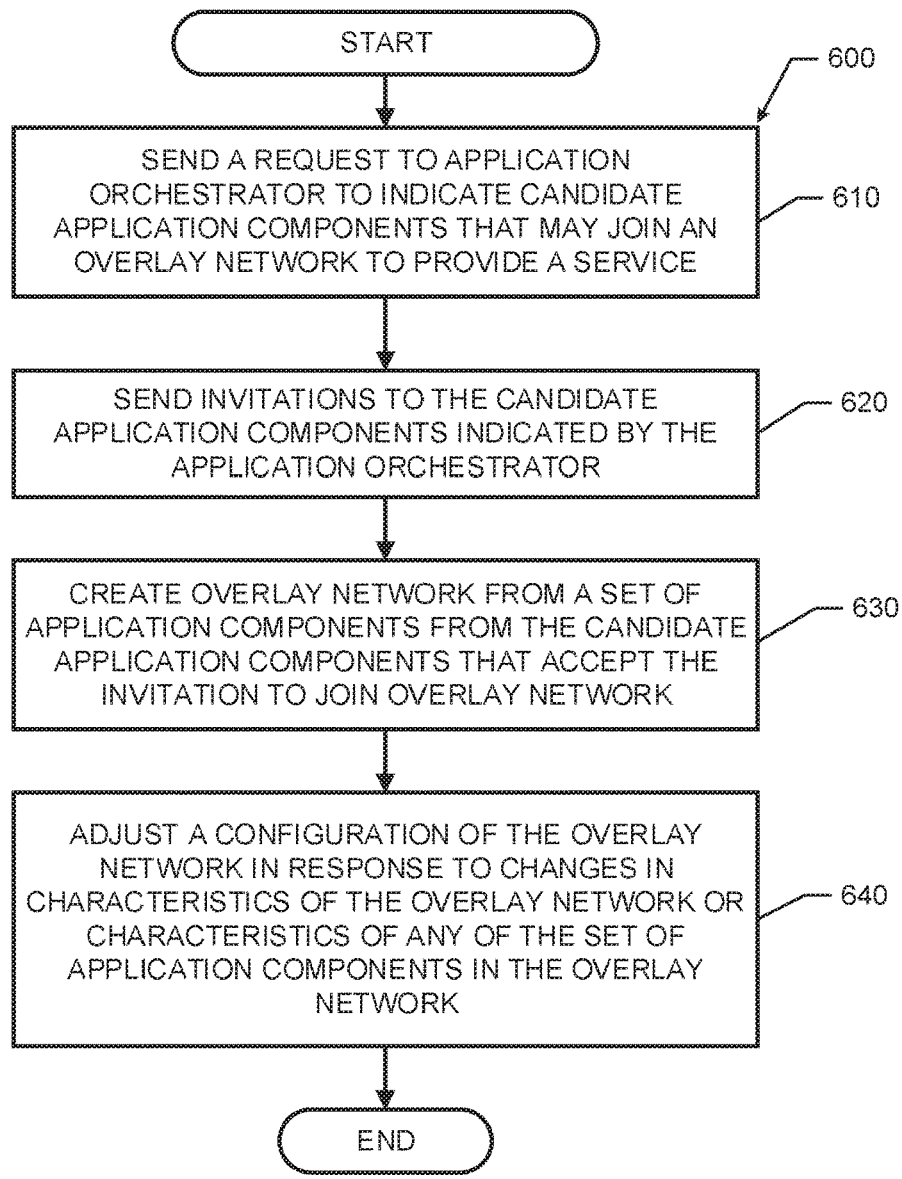
FIG. 6 is a flowchart representative of example machine readable instructions that may be executed to implement the overlay network manager of FIG. 3.

A flowchart representative of example machine readable instructions for implementing the overlay network manager 112 of FIG. 3 is shown in FIG. 6. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 6, many other methods of implementing the example overlay network manager may alternatively be used. For example, the order of execution of the blocks may be changed, and/or some of the blocks described may be changed, eliminated, or combined.

The example process 600 of FIG. 6 begins with an initiation of the overlay network manager 112 (e.g., upon startup, upon instructions from a user, upon startup of an application component 110 implementing the overlay network manager 112, etc.). The example process 600 may be executed to create and manage an overlay network in accordance with examples herein. At block 610, the orchestrator interface 310 sends a request to the application orchestrator 120 to indicate candidate application components that may join an overlay network to provide a service. The message manager 330, at block 620, sends invitations to the candidate application components indicated by the application orchestrator 120. At block 630, the application component connector 340 creates the overlay network from a set of application components from the candidate application components that accept the invitation to join the overlay network.

At block 640, the application component connector 340 adjusts a configuration of the overlay network in response to changes in characteristics of the overlay network or changes in characteristics of any of the set of application components in the overlay network.

In some examples, the orchestrator interface 310 may provide information on the configuration of the overlay network to the application orchestrator 120. For example, the overlay network manager 112 may send status updates providing the information on the configuration of the overlay network to the application orchestrator 120 periodically, such as every minute, every hour, etc. or aperiodically (e.g., any time a communication is sent between members of the overlay network, or a member joins or leaves the network). In some examples, after a configuration change occurs in the overlay network, the orchestrator interface 310 may indicate a configuration change to the application orchestrator. In some examples, the orchestrator interface 310 may receive (e.g., from the application orchestrator 120) an indication that a new application component is able to join the overlay network and the network decision manager 320 may determine whether to invite the new application component to join the overlay network based on characteristics of the overlay network. The network decision manager 320 may implement a PDP or interact with the policy manager 230 of the application orchestrator 120 to resolve its decision, which may indicate that the new application component is to be invited and the message manager 330 may send an invite to the new application component and the orchestrator interface 310 may indicate to the application orchestrator 120 whether the new application component joined the network based on whether the new application component accepted the invitation to join the overlay network.

As mentioned above, the example processes of FIGS. 5 and 6 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
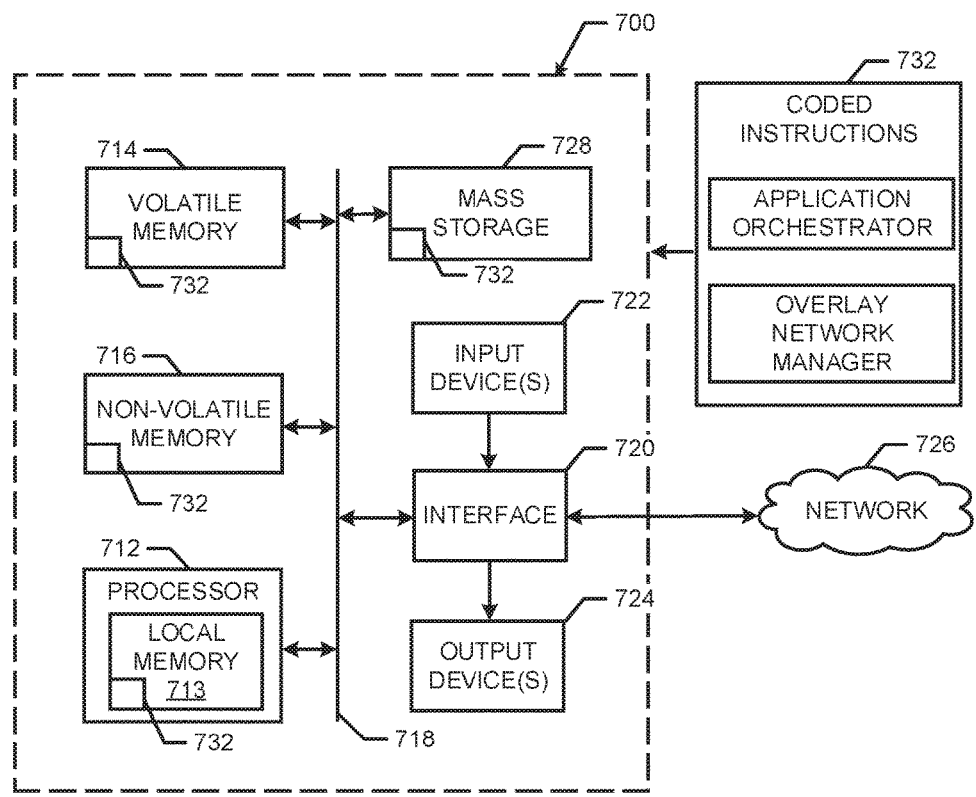
FIG. 7 is a block diagram of an example processor platform capable of executing the instructions of FIGS. 5 and/or 6 to implement the application orchestrator of FIG. 2 and/or the overlay network manager of FIG. 3, respectively.

FIG. 7 is a block diagram of an example processor platform 700 capable of executing the instructions of FIGS. 5 and/or 6 to implement the application orchestrator 120 of FIG. 2 and/or the overlay network manager 112 of FIG. 3, respectively. The example processor platform 700 may be or may be included in any type of apparatus, such as the heavy node 102 and/or in a server, a personal computer, a network device, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory, a persistent, byte-addressable memory accessible via a memory fabric and/or any other desired type of non-volatile memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible machine readable storage medium such as a CD or DVD.

From the foregoing, it will be appreciated that the above disclosed methods, apparatus and articles of manufacture provide for management of overlay network to enable storage, access, and control of data at or near the edge. In examples herein, application components, whether from the same or different vendors, may automatically and dynamically create, join, and leave overlay networks to share and exchange data with one another without sending, receiving (or retrieving) data to/from a cloud network. As such, data for application components of overlay networks can be sent/received in real-time. Furthermore, as an environment of an overlay network changes, examples herein enable for the overlay network to be adjusted accordingly to allow for the continued exchange of data between the members of the overlay network without interruption.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:

receiving, by an application orchestrator running on a first node of a network of nodes, a request from a requesting application component running on a second node of the network of nodes for candidate application components running on the nodes of the network to add to an overlay network owned by the requesting application component;

in response to the received request, selecting, by the application orchestrator, candidate application components based on characteristics of the overlay network indicated in the request and policies of the candidate application components;

providing, by the application orchestrator to the requesting application component, the selected candidate application components;

after providing the selected candidate application components to the requesting application component, receiving configuration information of the overlay network owned by the requesting application component from the requesting application component, the overlay network comprising the requesting application component and a set of application components that the requesting application component has chosen from the previously provided candidate application components to include in the overlay network owned and created by the requesting application component; and instructing, by the application orchestrator, that the requesting application components to change a configuration of the overlay network owned by the requesting application component, as indicated in the configuration information, based on conflicts between the configuration information and the policies of the set of application components and in response to changes in an environment of the overlay network, the requesting application component responsively modifying the configuration of the overlay network, the requesting application component and the set of application components providing an application service on the overlay network.

2. The method of claim 1, further comprising:

identifying the characteristics of the overlay network in the request, wherein the candidate application components are selected based on the ability of the candidate application components to share data according to the characteristics of the overlay network.

3. The method of claim 1, wherein the configuration information of the overlay network indicates a topology of the overlay network and indicates the application components of the set of application components.

4. The method of claim 1, wherein changes of the environment of the overlay network comprise an application component of the set of application components shutting down.

5. The method of claim 1, wherein changes of the environment of the overlay network comprise an application component of the set of application components being unable to meet performance requirements of the overlay network as specified by the characteristics of the overlay network in the request.

6. The method of claim 1, further comprising: determining that a new application component that is capable of joining the network based on the characteristics of the overlay network in the request after the overlay network is created; and
  indicating to the requesting application component that the new application component is available to be added to the overlay network.

7. The method as defined in claim 6, further comprising receiving an indication of whether the new application component was added to the overlay network.

8. The method as defined in claim 1, further comprising receiving changes to a configuration of the overlay network in the configuration information; and
  adjusting policies for the overlay network based on the changes.

9. The method of claim 1, wherein the first node comprises one of:
  a different node of the network of nodes than the second node; and
  a same node of the network of nodes as the second node.

10. A non-transitory machine readable medium comprising instructions that, when executed, cause a machine that is a second node of a network of nodes, to at least:
  send, by a requesting application component running on the first node, a request to an application orchestrator running on a first node of the network, to provide candidate application components running on the nodes of the network to add to an overlay network that the requesting application component owns;
  send, by the requesting application component, invitations to the candidate application components provided by the application orchestrator;
  create, by the requesting application component, the overlay network of a set of application components from the candidate application components that accept the invitation to join the overlay network;
  send, by the requesting application component to the application orchestrator, configuration information of the overlay network;
  responsively receive, by the requesting application component from the application orchestrator, an instruction to change a configuration of the overlay network in correspondence with conflicts that the application orchestrator determined between policies of the set of application components and the configuration provided; and
  responsively adjust the configuration of the overlay network as instructed by the application orchestrator and in response to changes in characteristics of the overlay network or characteristics of any of the set of application components in the overlay network, the requesting application component and the set of application components providing an application service on the overlay network.

11. The non-transitory machine readable medium of claim 10, wherein
  the application orchestrator is to indicate whether the configuration of the network is to be adjusted in response to changes in an environment of the overlay network, the environment of the overlay network monitored by the application orchestrator.

12. The non-transitory machine readable medium of claim 10, wherein the instructions cause the machine to:
  after a configuration change occurs in the overlay network, indicate the configuration change to the application orchestrator, the application orchestrator to adjust policies for the overlay network based on the configuration change.

13. The non-transitory machine readable medium of claim 10, wherein the instructions cause the machine to:
  receive an indication that a new application component is able to join the overlay network; and
  determine whether to invite the new application component to join the overlay network based on characteristics of the overlay network.

14. The non-transitory machine readable medium of claim 13, wherein if the characteristics of the overlay network indicate that the new application network is to be invited,
  send an invite to the new application component, and
  indicate to the application orchestrator whether the new application component joined the network based on whether the new application component accepts the invitation to join the overlay network.

15. An apparatus for managing overlay networks at the edge, the apparatus comprising:
  an orchestrator overlay connector connected to an overlay network of application components running on nodes of a network, the orchestrator overlay connector to receive a request from a requesting application component for candidate application components to add to the overlay network, the overlay network owned by the requesting application component;
  an environment monitor to monitor an environment of the overlay network;
  a policy manager to manage policies of the application components of the overlay network;
  an onboarding manager to manage overlay network adaptation activities based on policies of the overlay network and the application components and to dynamically manage the configuration of the overlay network in real-time based on changes to the policies and changes to the environment, the onboarding manager to select the candidate application components based on characteristics of the overlay network indicated in the request and the policies, the onboarding manager to provide the selected candidate application components to the requesting application component,
  wherein the environment monitor is to, after the onboarding manager provides the selected candidate application components, receive configuration information of the overlay network from the requesting application component,
  and wherein the onboarding manager is to change the configuration of the overlay network based on conflicts between the configuration information that the environment monitor receives and the policies, the requesting application component responsively modifying the configuration of the overlay network, the requesting application component and the set of application components providing an application service on the overlay network.

16. The apparatus of claim 15, wherein the onboarding manager is to dynamically manage the configuration of the overlay network in real-time by instructing an owner application component of the overlay network to adjust a topology of the overlay network by adding a new application component to the overlay network.

17. The apparatus of claim 15, wherein the onboarding manager is to dynamically manage the configuration of the overlay network in real-time by instructing the requesting application component to adjust a topology of the overlay network by removing an application component based on performance characteristics of the application component.

18. The apparatus of claim 15, wherein the onboarding manager is to instruct the requesting application component of the overlay network to invite the application components to join the overlay network in response to receiving the request.

19. The apparatus of claim 18, wherein the policy manager selected the applications to receive invitations to join the overlay network based on policies of the application components stored in a registry.

20. The apparatus of claim 15, wherein the environment of the overlay network comprises a network of heavy nodes executing the application components.

* * * * *